United States Patent
Honsinger

[15] 3,652,885
[45] Mar. 28, 1972

[54] SYNCHRONOUS RELUCTANCE MOTOR

[72] Inventor: Vernon B. Honsinger, Cincinnati, Ohio

[73] Assignee: Allis-Chalmers Manufacturing Company, Milwaukee, Wis.

[22] Filed: Sept. 16, 1970

[21] Appl. No.: 72,892

Related U.S. Application Data

[63] Continuation of Ser. No. 825,790, May 19, 1969, abandoned.

[52] U.S. Cl. .................................................310/163, 310/166
[51] Int. Cl. .................................................H02k 19/00
[58] Field of Search............310/168, 162, 169, 166, 161, 310/163, 156, 170, 181, 211, 261, 269

[56] References Cited

UNITED STATES PATENTS

| | | | |
|---|---|---|---|
| 2,913,607 | 11/1959 | Douglas | 310/211 |
| 3,210,584 | 10/1965 | Jorgensen | 310/162 |
| 3,126,493 | 3/1964 | Honsinger | 310/162 |
| 3,113,230 | 12/1963 | Linkous | 310/162 |
| 3,242,361 | 3/1966 | Varner | 310/166 |

FOREIGN PATENTS OR APPLICATIONS

| | | | |
|---|---|---|---|
| 871,183 | 4/1953 | Germany | 310/162 |

Primary Examiner—J. D. Miller
Assistant Examiner—R. Skudy
Attorney—John P. Hines, Robert B. Benson and Thomas F. Kirby

[57] ABSTRACT

A synchronous reluctance motor having a rotor with a plurality of circumferentially spaced quadrature axis slots near the surface of the rotor and across the quadrature axes. The bridges across the outer end of the quadrature axis slots and the teeth between adjacent quadrature axis slots define a flux path that is so proportioned to cause saturation thereof at the motor pullout torque condition whereas they are unsaturated at the motor no-load condition.

5 Claims, 4 Drawing Figures

Inventor
Vernon B. Honsinger
By John C Hines
Attorneys

SYNCHRONOUS RELUCTANCE MOTOR

This is a continuation of application No. 825,790, now abandoned.

This invention pertains in general to synchronous reluctance motors and more particularly to such a motor having a relatively large pullout torque while at the same time substantially eliminating rotor oscillations.

Synchronous reluctance motors were developed to provide a simple efficient constant speed machine requiring a minimum of control. The stator resembles that of an induction motor.

The rotor windings are usually die cast. There are no brushes, slip rings, etc. and the rotor does not require DC excitation as in the case of the conventional synchronous motor. The rotor laminations of prior art motors of this type were designed with polar projections separated by "cutouts" and with "flux barriers," as for example, that shown in the Bauer et al. U.S. Pat., No. 2,733,362, and the Risch U.S. Pat., No. 2,769,108, both assigned to the same assignee as this invention. These designs provide an easy path for flux flowing from one pole, through the rotor and then out an adjacent pole and a difficult path for flux flowing between poles or through the flux barriers and cutouts thereby increasing the motor pullout torque.

A disadvantage of the "conventional" reluctance motor is its tendency to oscillate at lower applied frequencies. The speed of the motor will be perfectly uniform at a frequency (say) 100 Hz.; but as the applied frequency is decreased, there may be observed an oscillation of the rotor. In other words, there is superimposed upon the rotor base speed an oscillatory speed of a few cycles per second. When a motor is operated over a range of frequencies at its rated flux level or volts per hertz, the applied frequency at which the rotor first oscillates is called $f_c$ or the critical frequency. At applied frequencies greater than $f_c$, the motor is stable. At $f_c$, the motor first becomes unstable and below $f_c$ the motor continues to be unstable, except at very low frequencies where the motor again becomes stable.

Generally, provision is made to prohibit reluctance motors from oscillating if the product they produce is to be uniform; as for instance, in the synthetic fiber industry where a uniform fiber size is critical. Sometimes to overcome oscillations, motor operation is limited to frequencies greater than $f_c$. Other times expensive corrective measures are taken to suppress $f_c$ to values outside the range of operation. It is not at all uncommon to find that reluctance motors oscillate at applied frequencies as high as 40 or 50 Hz. Also, it is not uncommon to find applications where motors are required to operate at 10 or 20 Hz. in a stable condition. It can thus be seen that in many instances it is quite difficult to insure that reluctance motors will not oscillate within their intended frequency range of operation.

The matter of oscillations is analyzed by use of inductances. The inductance calculated from that flux which flows through a pole is called $L_d$ or direct-axis inductance while the inductance calculated from the flux flowing between poles (through a cutout) is called $L_q$ or quadrature axis inductance.

The pullout torque for three-phase motors and the no-load critical frequency at which the motor first becomes unstable are given by the equations $$T_{po} = \frac{.014(V/f)^2 P}{L_q}\left(1 - \frac{L_q}{L_d}\right) F_{po} \text{ lbs. ft.}$$

$$f_c = K\frac{r_a}{L_q}\sqrt{\left(1 - \frac{L_q}{L_d}\right)\frac{r_{2q}}{r_a}} \text{ Hertz}$$

where

| | | |
|---|---|---|
| $T_{po}$ | = | Pull-out torque, lbs-ft. |
| $f_c$ | = | Critical frequency, Hz. |
| V | = | Per phase voltage applied to the motor. |
| f | = | Frequency of the voltage. |
| P | = | Number of poles. |
| $L_q$ | = | Quadrature axis inductance. |
| $L_d$ | = | Direct axis inductance. |
| $F_{po}$ | = | A supply frequency correction factor. |
| $r_a$ | = | Per phase stator resistance. |
| $r_{2q}$ | = | Per phase rotor quadrature axis resistance. |
| K | = | A factor which includes the attached inertia and quantities having a secondary effect. |

In order to achieve a large pullout torque, $L_q$ should be small while the quantity $(1 - L_q/L_d)$ should be large since this increases $T_{po}$ in its equation. But this is contrary to the condition of suppressing $f_c$ since to make $f_c$ small requires that $L_q$ be large and the quantity $(1 - L_q/L_d)$ be small — exactly opposite to the requirement for a large pullout torque.

Thus, the basic dilemma is that if one wishes to design a motor for a torque rating which utilizes its material economically, and whose size is acceptable to the user, he generally will find that the critical frequency is too large for the user. Since in referring to the conventional reluctance motor, the magnitudes of $L_d$ and $L_q$ are approximately constant at all loads and frequencies, there appears to be no way out of the basic dilemma that large pullout torques may be had only at the expense of unsatisfactory critical frequencies.

This invention does, however, disclose a solution to this basic dilemma. It has been observed that loading the motor suppresses the critical frequency — the largest critical frequency (with respect to loading) occurs practically at no-load. Now presume that, unlike conventional reluctance motors, $L_q$ may be varied with respect to load while $L_d$ remains fairly constant. At no-load $L_d$ and $L_q$ are called $L_{dnl}$ and $L_{qnl}$ while at pullout they are called $L_{dpo}$ and $L_{qpo}$. We can then rewrite the pullout torque and no-load critical frequency equations as follows:

$$T_{po} = \frac{.014(V/f)^2 P}{L_{qpo}}(1 - L_{qpo}/L_{dpo}) F_{po}$$

$$f_c = K\frac{r_a}{L_{qnl}}\sqrt{\left(1 - \frac{L_{qnl}}{L_{dnl}}\right)\frac{r_{2q}}{r_a}}$$

Next presume that the magnitudes of the $L_d$'s and $L_q$'s can be designed so that they vary with load according to the following graph wherein $L_d$ is nearly constant between no-load and pullout while $L_q$ is much larger at no-load than at pullout.

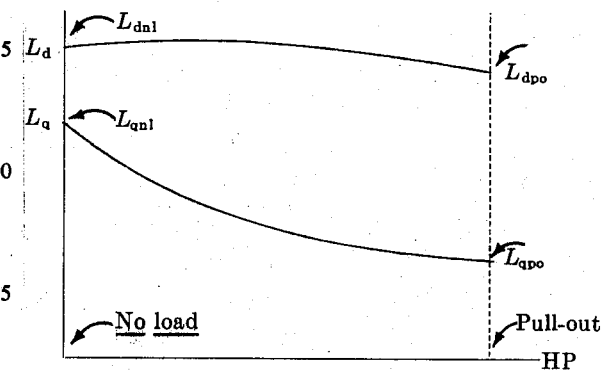

Variation of $L_d$ and $L_q$ with HP load

Consider now the consequences when $L_d$ and $L_q$ vary with hp. as shown by this graph.

i. At no-load, the criteria for a small $f_c$ is obtained since $L_{qnl}$ is large and the quantity $(1 - L_{qnl}/L_{dnl})$ is small in the equation for $f_c$. On the other hand, the equation for pullout torque using no-load values of $L_d$ and $L_q$ is irrelevant since the value of $L_d$ and $L_q$ at no-load do not apply to the pullout condition. In other words, since there is no load on the motor, the torque at pullout is not only unimportant at this point, but values of $L_d$ and $L_q$ measured at pullout must not be used at no-load.

ii. At pullout, a large $T_{po}$ (pullout torque) is obtained since $L_{qpo}$ is small and the quantity $(1 - L_{qpo}/L_{dpo})$ is large in the equation for $T_{po}$. Also, the just-mentioned values of $L_d$ and $L_q$ measured at pullout do not apply to no-load or even to full load when one is considering only values at pullout.

The situation so obtained satisfies both heretofore conflicting requirements so that motors simultaneously may be stable from no load through full load and also have large pullout torques if $L_d$ and $L_q$ vary with load as shown by the graph.

It is, therefore, a general object of this invention to construct a synchronous reluctance motor having a relatively large pullout torque and a relatively low critical frequency.

An additional object of the subject invention is to provide a synchronous reluctance motor wherein the quadrature axis inductance may be decreased as the load on the motor increases while the direct axis inductance remains fairly constant.

A further object of the subject invention is to provide a synchronous reluctance motor wherein means are provided across the quadrature axis to form a flux path which is unsaturated at the motor no-load condition and becomes progressively more saturated as the load is increased to a point where it is substantially saturated at the motor pullout condition.

A more specific object of the subject invention is to provide a synchronous reluctance motor having the above-identified characteristics wherein the rotor is provided with quadrature axis slots having magnetic flux conducting teeth therebetween which are unsaturated at no-load and are substantially saturated at pullout.

An additional object of the subject invention is to provide a synchronous reluctance motor of the hereinbefore described type wherein bridges of magnetic material are provided between and connect adjacent teeth.

These and other objects of the subject invention will become more fully apparent as the following description is read in light of the attached drawings wherein.

Figure 3:
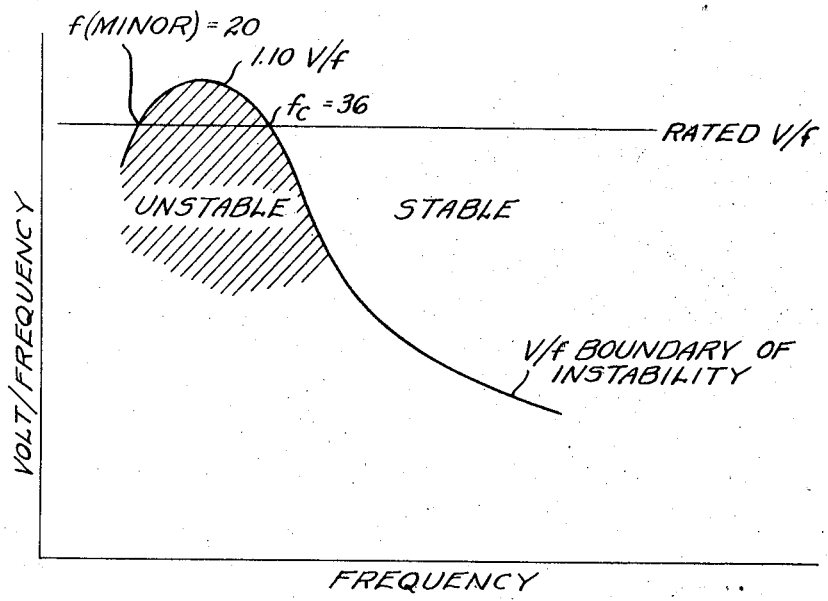
Figure 4:
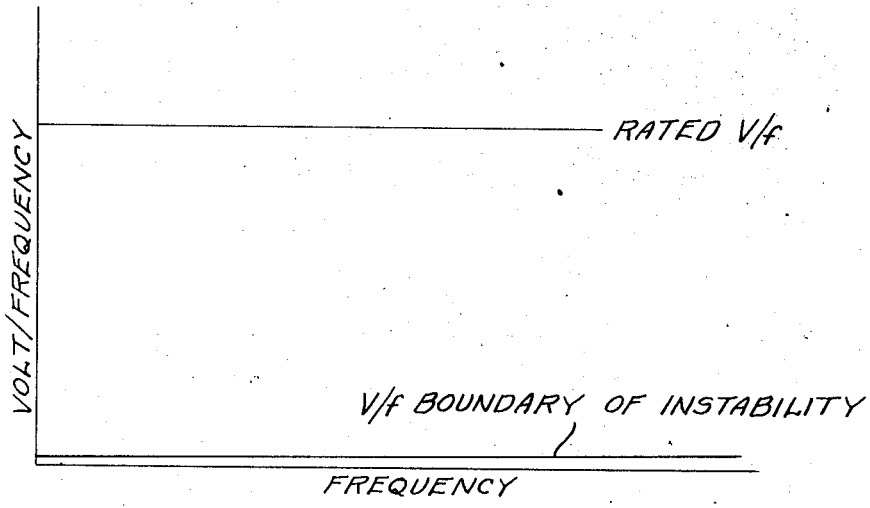

FIG. 3 is a Volt/Frequency vs. Frequency graph of a typical 2 hp. four-pole synchronous reluctance motor; and FIG. 4 is a Volt/Frequency vs. Frequency graph of a synchronous reluctance motor constructed in accordance with the invention.

Figure 1:
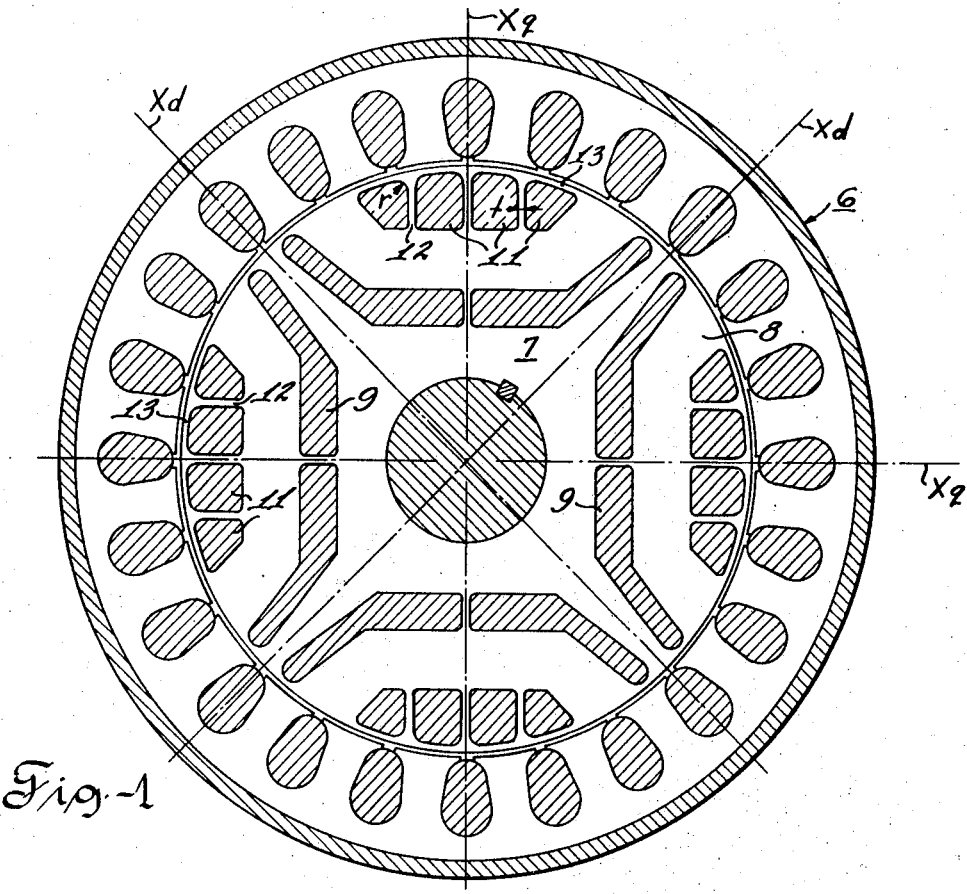
FIG. 1 shows a cross section of a preferred form of synchronous reluctance motor constructed in accordance with the invention having two flux barriers per pole and three saturable quadrature axis teeth per pole with bridges therebetween.
Figure 2:
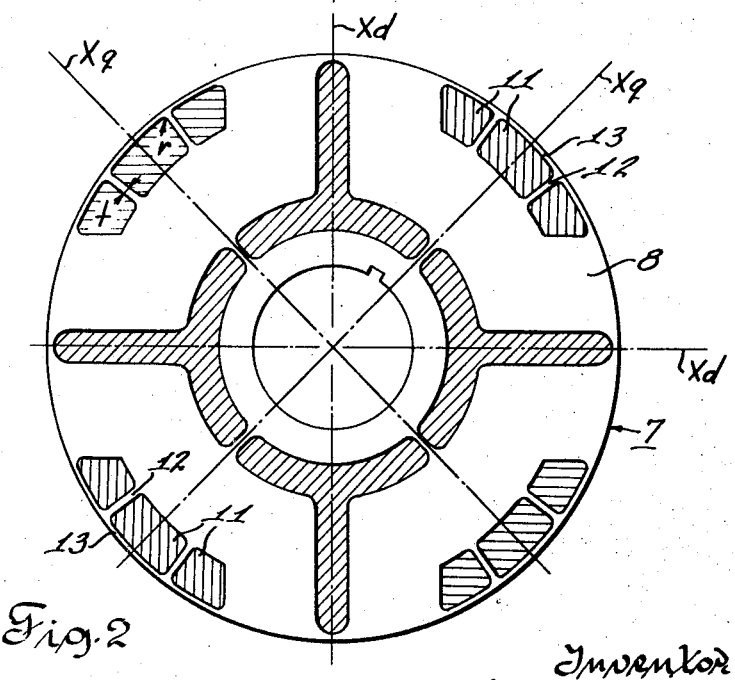
FIG. 2 shows a cross section of a modified form of synchronous reluctance motor rotor constructed in accordance with the invention having one flux barrier per pole and two saturable quadrature axis teeth per pole and having bridges therebetween.

The motors shown in the drawings for purposes of illustration are four-pole. However, it should be understood that it is not intended to limit this invention to a four-pole machine. FIGS. 1 and 2 also show three and two radial saturable teeth per pole and two and one flux barriers per pole. It should be understood that there may be other than three or two radial saturable teeth and other than two or one flux barriers per pole. It also should be understood that there may be no flux barriers and no teeth as such, so long as the flux path provided is of a size and character to be unsaturated at no-load and substantially saturated at pullout.

The stator 6 is of the conventional induction motor type well-known to those skilled in the art. The rotor of the subject invention is generally designated 7 and may be composed of a plurality of punched laminations 8. As shown herein for purposes of illustration, each lamination may be provided with one or more flux barriers per pole generally designated 9 centrally located about each quadrature axis which are designated $x_q$. The configuration and location of the flux barriers 9 are such as to increase the pullout torque in the manner which is well-known in the prior art.

Nonmagnetic means herein shown for purposes of illustration as a plurality of circumferentially spaced quadrature slots 11 are provided adjacent the outer peripheral surface of the rotor 7. These quadrature slots 11 are symmetrically located with respect to the quadrature axis $x_q$. Each pair of adjacent quadrature slots 11 define therebetween saturable teeth 12 and saturable bridges 13. Although the quadrature slots 11 may open to the periphery of the laminations 8 they are herein shown as enclosed by saturable bridges 13 to provide mechanical strength to the laminations.

The saturable teeth 12 and if included, the bridges 13, are proportioned so that when the load varies, inductances $L_q$ and $L_d$ vary such that $L_q$ increases in magnitude toward no-load while $L_d$ remains essentially constant. $L_q$ measured at no-load typically is three times that of $L_q$ measured at pullout. This is accomplished by proportioning the saturable teeth 12 and, if included, the bridges 13 so that they are unsaturated at no-load and become progressively saturated as the motor is loaded finally becoming substantially totally saturated at pullout. Hereafter reference to the bridges 13 will not be made; however, if they are included in the rotor, their size must be included in the same manner as the teeth 12 in determining the size and character of the flux path.

The criteria that the saturable teeth are unsaturated at no-load and substantially totally saturated at pullout is given by the condition:

$$\frac{B_{ns}}{(B_{d4})nl} - 1 \geq \frac{2r}{t} \geq \frac{B_s}{(B_{q4} - B_{d4})po} - 1$$

hereinafter referred to as inequality (5);

where (presuming there exists more than one saturable tooth per pole)

$B_s$ is the intrinsic saturation density of the steel $B_{ns}$ is the nonsaturated flux density level of the steel $(B_{q4} - B_{d4})po$ is the flux density in the airgap over that saturable tooth which is adjacent to the center saturable tooth (or q-axis)

$(B_{d4})nl$ is the flux density in the airgap over that saturable tooth which is adjacent to the center saturable tooth (or q-axis) measured or calculated at no-load.

The magnitudes of the flux densities $(B_{q4} - B_{d4})po$ and $(B_{d4})nl$ are:

$$(B_{q4} - B_{d4})po = \frac{B_g(\max)}{\sqrt{2}} \left[ \frac{L_d}{L_q} \left( \sin \frac{\pi p_s}{2} - \frac{2f_b}{\pi} \right) - \cos \frac{\pi p_s}{2} \right]$$

$$(B_{d4})nl = B_g(\max) \cos \frac{\pi p_s}{2}$$

where

| | | |
|---|---|---|
| $B_g$ (max) | = | Maximum airgap flux density |
| $p_s$ | = | Specifies location of the saturable tooth |
| $L_d, L_q$ | = | Inductance values at no-load |
| $f_b$ | = | A characteristic function which is largely determined by the barrier configuration. The magnitude of $f_b$ runs around .6 for typical motors of any pole number. |

The thickness $t$ along the saturable tooth and the radius $r$, which together define the tooth outer thickness $w_t = 2r + t$, are defined by inequality (5) in which the ratio $2r/ti$ $t$ must be less than the condition cited at no-load in (5) and greater than the condition cited in (5) at pullout.

The stability of the motor of this invention can be aptly compared with the stability of a typical synchronous reluctance motor. A typical old style synchronous reluctance motor has a V/f vs. f plot shown by FIG. 3. The motor is unstable throughout the area beneath the curve. Referring to FIG. 3, as the frequency is lowered keeping V/f constant at rated V/f level, the motor first becomes unstable at 36 Hz. and continues to be unstable down to 20 Hz. and then becomes stable again.

A motor constructed in accordance with the invention has a V/f vs. f plot shown by FIG. 4 in which no instability can be found. The motor is extraordinarily stable since even lowering the voltage to the limit where it pulls out of step at no-load does not cause instability when also using zero attached inertia at no-load which is the worst case.

An extremely important additional effect, caused by the introduction of saturable teeth, is a reduction in the magnitude of the quadrature axis resistance $r_{2q}$ during lightly loaded conditions and a tendency of $r_{2q}$ to be rendered equal to the direct axis resistance $r_{2d}$.

The reason for this follows. Presuming first that saturable teeth 12 are nonexistent, the flux in the area of the quadrature slots which now are more properly called cutouts 11, consists essentially of a strong fringing flux near the pole tips and weak lines of flux in the cutout area. The space distribution of induced current throughout the cutout area follows the flux pattern just described. In other words, the current flow is concentrated in a small zone near the pole tips. Thus, the resistance of the cutout area may be simulated by a very small area of conductive material existing near the pole tips and hence, the resistance is large. The total resistance $r_{2q}$ of which the cutout area resistance forms a part is therefore large.

When saturable teeth exist, the flux through each tooth completely surrounds each quadrature slot 11 causing current to flow nearly uniformly in each quadrature slot area. Hence, the resistance of all quadrature slots now is properly found from the entire area of all quadrature slots instead of a very small area existing near the pole tips.

Reduced rotor resistance $r_{2q}$ improves both stability and synchronizing ability. The effect is very large on stability since $f_c$ is proportional to $\sqrt{r_{2q}}$ and $\sqrt{r_{2q}}$ is but a fraction of the "old" $\sqrt{r_{2q}}$ found when saturable teeth do not exist.

In addition to having a profound effect on motor stability the saturable teeth also affect other characteristics of the motor. In particular, starting current is lowered and synchronizing ability is increased. The reduction of $r_{2q}$ increases synchronizing ability.

The embodiments of the invention in which an exclusive property or privilege is claimed are defined as follows:

1. A synchronous reluctance motor comprising: a stator; a rotor rotatable relative to said stator and defining therebetween an air gap, said rotor including a magnetic core having at least one quadrature axis and at least one direct axis; and nonmagnetic means terminating short of the rotating axis of said rotor positioned across a quadrature axis defining therebetween a magnetic flux path void of any rotor winding extending to the radially outer end of said rotor in the vicinity of said quadrature axis and being of a size and magnetic character to be unsaturated at the motor synchronous speed no-load condition and substantially saturated at the motor pullout condition.

2. The synchronous reluctance motor set forth in claim 1 wherein said flux path includes at least one projecting tooth composed of magnetic core material defining an air gap with said stator substantially equal to said first mentioned air gap.

3. The synchronous reluctance motor set forth in claim 1 where said flux path includes at least two circumferentially spaced teeth, and further comprising a bridge of magnetic material connecting the outer ends of said teeth.

4. A synchronous reluctance motor comprising: a stator; a rotor rotatable relative to said stator and defining therebetween an air gap, said rotor including a magnetic core having at least one quadrature axis and at least one direct axis; and means positioned across a quadrature axis providing a magnetic flux path of a size and magnetic character wherein the ratio of the width of the radial end of said flux path to the width of the remaining portion of said flux path is (i) equal to or less than the nonsaturated flux density level of the core material divided by the actual flux density existing in the end of the flux path at the motor no-load condition, and (ii) equal to or greater than the intrinsic saturation density of the core material divided by the actual flux density existing in the end of the flux path at the motor pullout condition, whereby said flux path is unsaturated at the motor no-load condition and substantially saturated at the motor pullout condition.

5. A synchronous reluctance motor having a stator, and a rotor rotatable relative to said stator, said rotor comprising: a cylindrical magnetic core having at least one quadrature axis and at least one direct axis; and nonmagnetic means positioned across a quadrature axis, said means defining therebetween at least one tooth of magnetic material extending substantially to the radially outer end of said rotor with the radially outer end of said tooth being wider than a radially inner portion thereof when viewed in a plane passing through said rotor normal to the axis thereof, said tooth providing a flux path void of any rotor windings, said flux path being of a size and magnetic character to cause said tooth to be unsaturated at the motor no-load condition and to be substantially saturated at the motor pullout condition.

* * * * *